United States Patent
Lee et al.

(10) Patent No.: US 9,437,048 B2
(45) Date of Patent: Sep. 6, 2016

(54) SEARCHING METHOD FOR PLANE AREA OF 3D MODEL

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Yi-Hsun Lee, New Taipei (TW); Hsin-Chi Liao, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 84 days.

(21) Appl. No.: 14/535,298

(22) Filed: Nov. 6, 2014

(65) Prior Publication Data
US 2016/0019725 A1    Jan. 21, 2016

(30) Foreign Application Priority Data
Jul. 18, 2014    (TW) .............................. 103124705 A

(51) Int. Cl.
  *G06T 19/20*    (2011.01)
  *G06T 17/10*    (2006.01)
  *G06K 9/00*    (2006.01)

(52) U.S. Cl.
  CPC ........... *G06T 19/20* (2013.01); *G06K 9/00201* (2013.01); *G06T 17/10* (2013.01); *G06T 2219/2004* (2013.01)

(58) Field of Classification Search
None
See application file for complete search history.

(56) References Cited

U.S. PATENT DOCUMENTS
2008/0294401 A1    11/2008    Tsin et al.

FOREIGN PATENT DOCUMENTS
TW    200903378 A    1/2009
WO    03027961 A2    4/2003

OTHER PUBLICATIONS

Okino Computer Graphics, "StereoLithography STL Importer," Jul. 1, 2013, http://www.okino.com/conv/imp_stl.htm.*
Rajendran Pullat, "Manufacturing Feature Recognition by 3D Solid Model Slicing and Contour Based Geometric Reasoning," National Institute of Technology, Clicut, India, Jul. 2002.*
Office Action dated Oct. 2, 2015 of the corresponding Taiwan patent application.

* cited by examiner

*Primary Examiner* — Kee M Tung
*Assistant Examiner* — Nicholas R Wilson
(74) *Attorney, Agent, or Firm* — Chun-Ming Shih; HDLS IPR Services

(57) ABSTRACT

A method for searching plane area on a 3D model comprises following steps of: obtaining an outline of the 3D model; setting a lowest point of the outline based on a datum axis to be a locate point; extending from the locate point along another two axes to search all coordinate points within the outline at a substantially height on the datum axis with the locate point; reserving of the information of the continual coordinate points which can constitute a plane area; recording the plane area; amending value on the datum axis to add fixed variable of the locate point; executing above steps repeatedly until the locate point is amended to be the highest point of the outline based on datum axis. The present disclosure can actually search for all plane area on the outline of the 3D model, so as to help the combination with other 3D models.

11 Claims, 8 Drawing Sheets

SEARCHING METHOD FOR PLANE AREA OF 3D MODEL

BACKGROUND OF THE INVENTION

1. Technical Field

The technical field relates to a searching method, and more particularly, to a searching method for plane area on the outline of 3D model.

2. Description of Related Art

The 3D printing can customize a real model required by the user quickly, which is rather convenient. In addition, with the development of the 3D printing technology, the 3D printer becomes not costly that much. Thus, in recent years, people soon become more familiar with the 3D printing technology.

The 3D printer prints a real model that is corresponding to a 3D model that is edited or imported by the editing software. In other words, the appearance of the 3D model would directly affect the appearance of the printed real model. Generally speaking, a final completed 3D model would be a combination of several single 3D models. For example, if a table with numbers on its top is desired, there'll be a 3D model of table edited first, then a 3D model of numbers edited, and finally a combining 3D model of these two produced.

It is worth mentioning that, when combining several 3D models, generally, one 3D model is placed on a plane area on the outline of another 3D model. Thereby, it can make sure that the printed real model is smoothing. However, there's difference between computer and human brain, it's impossible for the computer to directly determine the locations of plane areas and non-plane areas on the outline of a 3D model.

Accordingly, currently, when the editor combines several 3D models, he would generally search for the plane area on the outline of a 3D model with his naked eyes, then place another 3D model on the plane area, and finally complete the combination of two 3D models, which is rather inconvenient.

SUMMARY OF THE INVENTION

The disclosure is directed to a searching method for plane area of 3D model, which can actually search for all plane area on the outline of 3D model so as to successfully combine the 3D model with another one 3D model or several 3D models.

One of the exemplary embodiments, the searching method comprises: obtaining an outline of the first 3D model; setting a lowest point of the outline based on a datum axis to be a locate point; extending from the locate point to another two axes to search all coordinate points on the outline, which have the same or very similar height on the datum axis with the locate point; reserving a plurality of continual coordinate points which can constitute a plane area; recording the plane area; amending value on the datum axis to add a fixed variable of the locate point; and executing the above steps until the locate point is the highest point of the outline of the 3D model on the datum axis.

When a 3D model is going to be combined with another one 3D model or a plurality of 3D models, it would mainly happen on each plane area on the outline of the 3D model. However, it is impossible to directly determine via computer where the plane area is on the outline of the 3D model. Comparing with the prior art, the present one of the exemplary embodiments can actually search all plane area on the outline of the 3D model. Thereby, it would help a 3D model be combined with another one 3D model or a plurality of 3D models, such as words, symbols, patterns or the like.

DETAILED DESCRIPTION OF PREFERRED EMBODIMENTS

Based on a preferred embodiment of the present one of the exemplary embodiments, it is described with figures as below. One of the exemplary embodiments herein discloses a searching method for plane area of 3D model (hereinafter referred to as the searching method). The searching method is mainly applied in an editing software. The editing software is to edit a 3D model and to save it as a 3D model data. The edited 3D model is provided to a 3D printer for outputting a real model.

Figure 1:
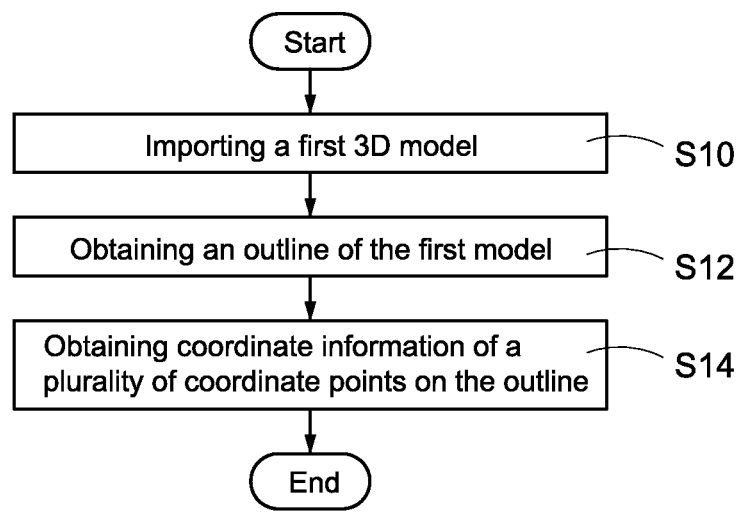
FIG. 1 is a flow chart for importing a 3D model according to the first embodiment of the present one of the exemplary embodiments.

To begin with, please refer to FIG. 1, FIG. 1 is a flow chart for importing a 3D model according to the first embodiment of the present one of the exemplary embodiments. In the searching method of the present embodiment, at the beginning, a first 3D model data is imported into the editing software (Step S10) so as to open a first 3D model (as the first 3D model 4 shown in FIG. 3, hereinafter referred to as the first model 4) in the editing software. One of the exemplary embodiments, the first 3D model data is a file having ".stl" as its extension, however it is not limited thereto.

After the first 3D model has been imported into the editing software and the first model 4 has been opened, an outline of the first model 4 is obtained (Step S12). Also, coordinate information of a plurality of coordinate points constituting the outline is obtained (Step S14). It is worth mentioning that, the process of 3D models may be different regarding to different editing software, so the executing order of the Step S12 and S14 is not limited thereto. For example, in this embodiment, the editing software first obtains the outline of the first model 4 and then obtains coordinate information of each coordinate point constituting the outline; however, in other embodiments, instead, the editing software can also obtain coordinate information of each coordinate point from the first 3D model data first and then obtain coordinate information of a plurality of coordinate points on the outline so as to constitute the outline of the first model 4. The above are merely the preferred embodiments, so it is not limited thereto.

Figure 2:
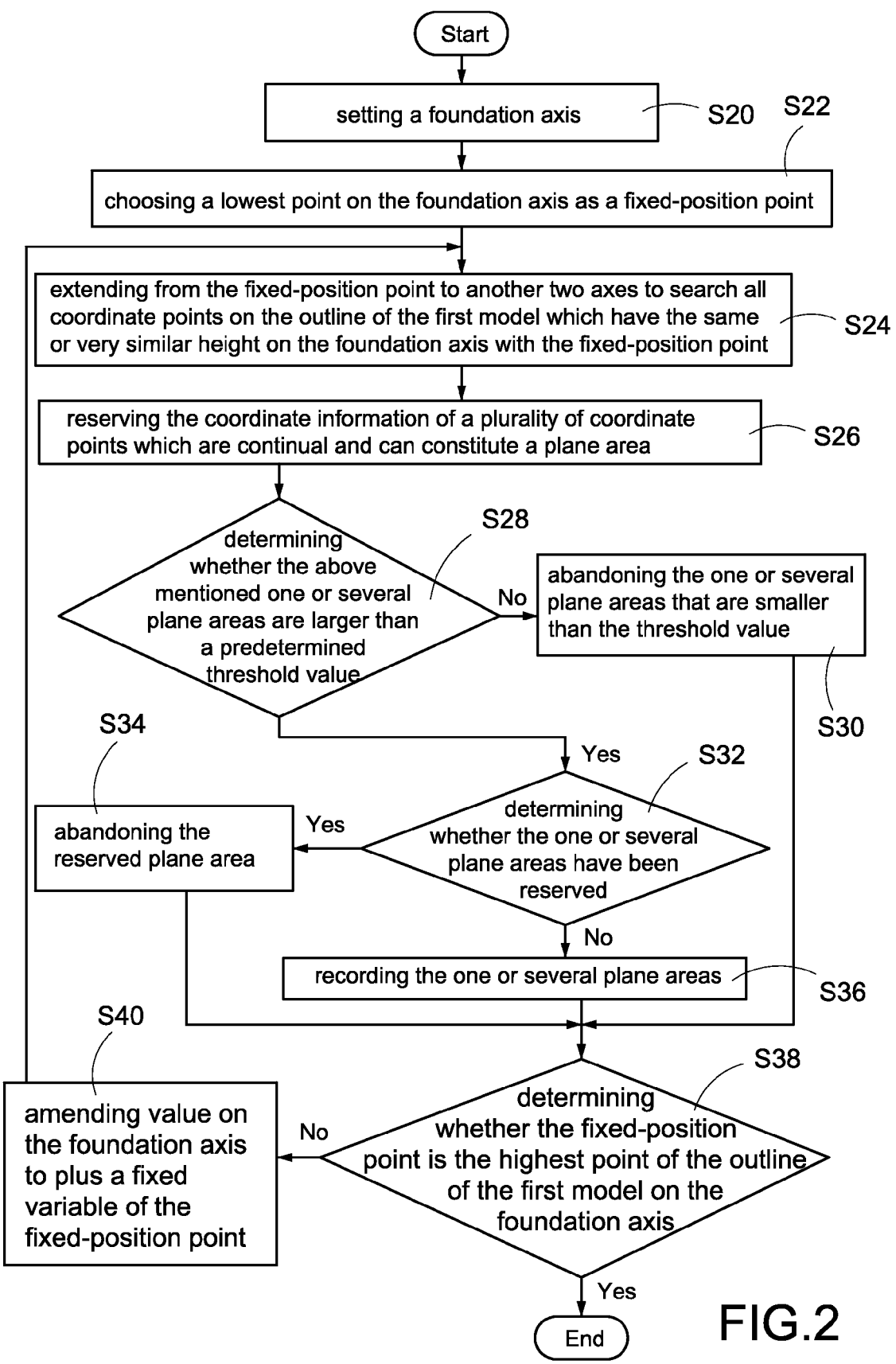
FIG. 2 is a flow chart for searching according to the first embodiment of the present one of the exemplary embodiments.

Please refer to FIG. 2, FIG. 2 is a flow chart for searching according to the first embodiment of the present one of the exemplary embodiments. In the present embodiment, the searching process shown in FIG. 2 can be automatically executed by the editing software after the first model 4 has been opened, or the searching process shown in FIG. 2 can be executed after an editor (not shown) manually triggers a searching function. Thus, it is not limited thereto. Via the searching process shown in FIG. 2, the editing software finds out one or several plane areas on the outline of the first model 4 which can combine with another one or other several plane areas.

One of the exemplary embodiments, the editing software is a software that can edit 3D models wherein the editing area includes three axes. After the first model 4 has been opened, the editor is required to set one axis as a datum axis (Step S20). Generally, the editing software of 3D model mainly processes model the 3D model based on a Cartesian coordinate with X, Y and Z axis; however, it is not limited according to different initial values of the 3D model that were loaded, such as angles. Please note that in order to describe the present embodiment in an understandable and clear way, in the following description, the X, Y and Z axis are taken as example and the Z axis is considered a datum axis; however, it should not be a limitation to the present invention.

Figure 3:
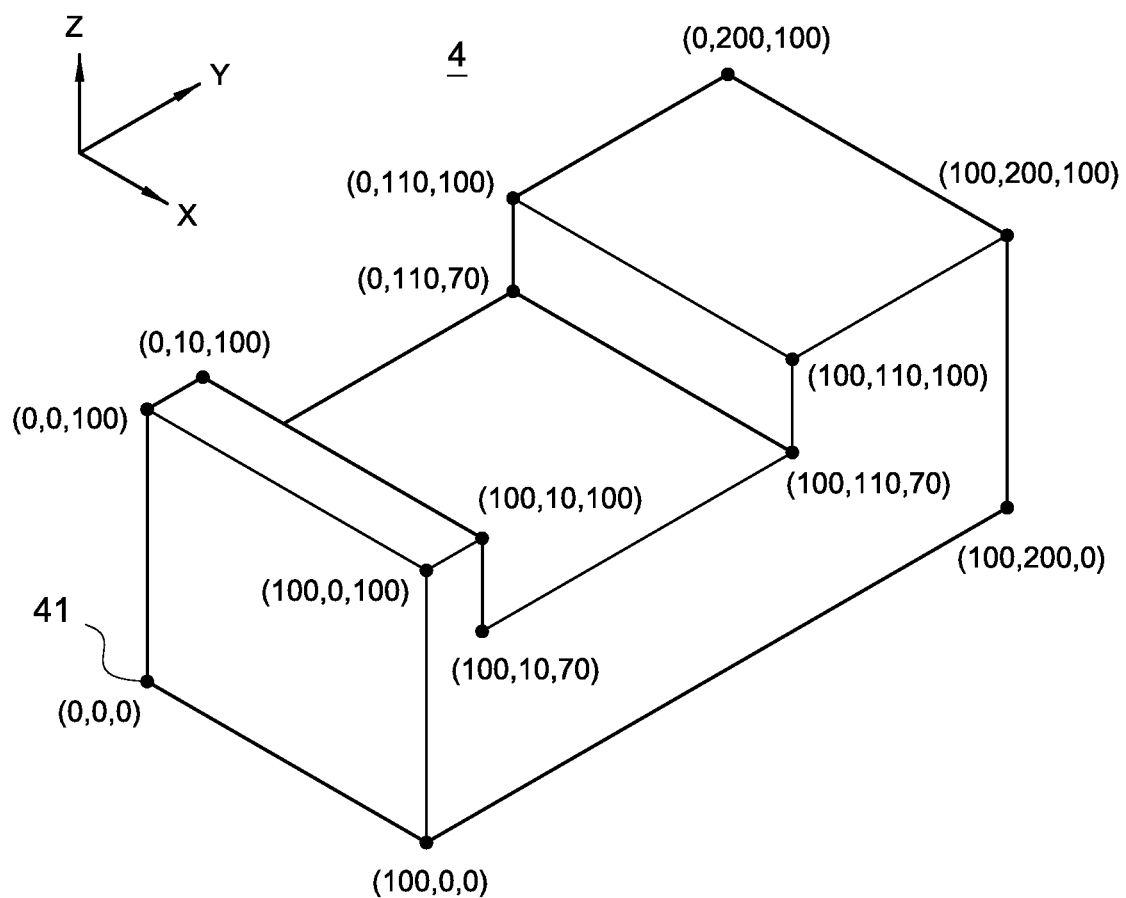
FIG. 3 is a schematic drawing of the first searching process according to the first embodiment of the present one of the exemplary embodiments.

After setting the datum axis, among a plurality of coordinate points on the outline of the first model 4, the editing software further chooses a lowest point on the datum axis as a locate point such as the locate point 41 shown in FIG. 3 (Step S22). For example, if the outline of the first model 4 comprises coordinate points from (X, Y, 0) to (X, Y, 100), the editing software would choose the coordinate point (X, Y, 0) as the initial locate point 41 because the minimum value of Z axis among these coordinate points is 0. After that, the editing software starts to search from the bottom to the top of the first model 4. However, in other embodiments, among a plurality of coordinate points on the outline of the first model 4, the editing software can also choose a highest point on the datum axis as a locate point 41, and start to search from the top to the bottom of the first model 4, which is not limited thereto.

After the Step S22, the editing software extends from the locate point 41 to another two axes to search all coordinate points on the outline of the first model 4 which have the same or very similar height on the datum axis with the locate point (Step S24). For example, if the locate point 41 is (10, 10, 0), the editing software can search for coordinate points (9, 10, 0), (11, 10, 0), (10, 9, 0), (10, 11, 0), etc. After that, the coordinate information of a plurality of coordinate points which are continual and can constitute one or several plane areas is reserved (Step S26). After the Step S26, coordinate points which are not continual or which are continual but cannot constitute an effective plane area would be abandoned.

In addition, the editing software further determines whether the above mentioned one or several plane areas are larger than a predetermined threshold value (Step S28). If not, the one or several plane areas that are smaller than the threshold value are abandoned (Step S30). In this embodiment, the threshold value can be set by the editing software automatically, or by the editor manually, and it is not limited thereto. In another embodiment, if the area value of another 3D model which is to be combined is checked by the editor, the area value can be set as the threshold value so as to make sure that the recorded one or several plane areas can be combined with it.

If one or several plane areas are larger than the threshold value, the editing software further determines whether the one or several plane areas have reserved (Step S32). One of the exemplary embodiments, the first model 4 can actually be combined with several 3D models (combined with several 3D models respectively via several plane areas, or combined with several 3D models on a single plane area without overlapping). Thus, if the one or several plane areas have been reserved for combining with other 3D models, the editing software would abandon the reserved plane area (Step S34), and would not record the plane area repeatedly so as to prevent from the overlapping that may happen after several 3D models are combined with the first model 4. However, in practice, the editing software can merely determine whether the one or several plane areas are larger than the threshold value, and also can merely determine whether the one or several plane areas have reserved, that is, it does not have to go through both the above steps S28 and S32. Besides, the editing software can mark the plane areas which are too small or have reserved, and then abandon the marked plane areas in the steps S30 and S34.

As mentioned above, if the one or several plane areas are larger than the threshold value and have not been reserved, the one or several plane areas are recorded (Step S36). After the steps S30, S34 or S36, the editing software determines whether the locate point 41 is the highest point of the outline of the first model 4 on the datum axis (Step S38). If the locate point 41 is a highest point of the outline on the datum axis, the search for the first model 4 on the datum axis has been finished. If the locate point 41 is not a highest point of the outline on the datum axis, the editing software amends value on the datum axis to add a fixed variable of the locate point (Step S40), and executes the steps from S24 to S38 repeatedly until the search for the first model 4 has been finished.

It is worth mentioning that, according to different resolutions or printing speeds of the 3D printers, the fixed variable may be different values, such as 0.01, 0.1, 1, 3, 5, etc. If the fixed variable is relatively small, the time consumption of the search for the first model 4 would be longer but the searching result would be more precise. On the other hand, if the fixed variable is relatively large, the time consumption of the search for the first model 4 would be shorter but the searching result would be rougher. Thus, it depends on the user's needs. The above mentioned fixed variable is generally positive; however, if the editing software initially chooses the highest point of the outline of the first model 4 on the datum axis as the locate point 41 and starts to search from the top to the bottom of the first model 4, the fixed variable can also be negative.

The above steps are to search for plane area of the outline of the first model 4 on the datum axis. After the search for the first model 4 on the datum axis has been finished, the other axes can turn to be the datum and the above steps from S22 to S40 are executed repeatedly so as to search plane area of the first model 4 on the other axes. For example, in the description of the above embodiment, the editing software searches the plane area of the outline of the first model 4 on the Z axis. After the search on the datum axis, which is Z axis, has been finished, the X and Y axes can be chosen as the datum axis in turn, and the above steps from S22 to S40 are executed repeatedly so as to search plane area of the outline of the first model on the X and Y axes. Thereby, the editing software can obtain plane area of the first model 4 on all axes.

One of the exemplary embodiments, the editing software shows all candidate plane areas in a list after searching all plane area which is as required and has not reserved, so as to provide choices to the user so that he can decide on which plane area another model should be combined. Other one of the exemplary embodiments, once the editing software finds a plane area, it would determine whether this plane area is large enough to be used for the combination with another model. If it is large enough, the editing software stops searching, but if no, the editing software would adjust height of the datum axis 41 of the locate point 41 and continue to search other plane areas.

Figure 4:
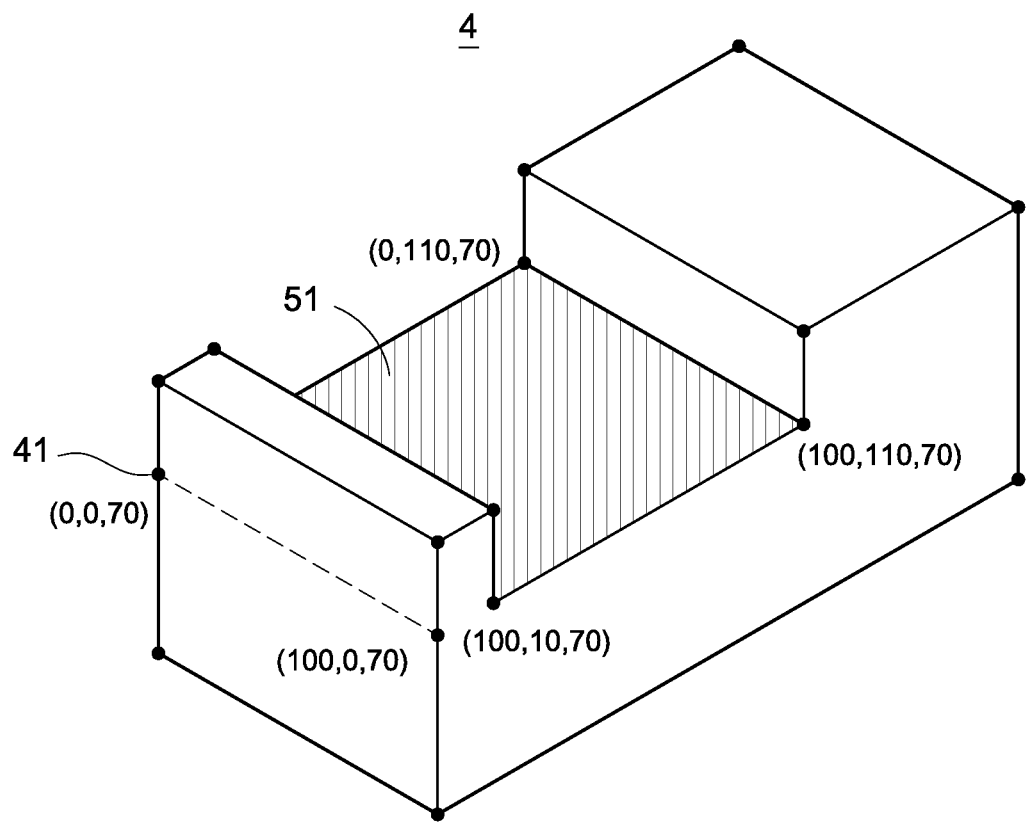
FIG. 4 is a schematic drawing of the second searching process according to the first embodiment of the present one of the exemplary embodiments.
Figure 5:
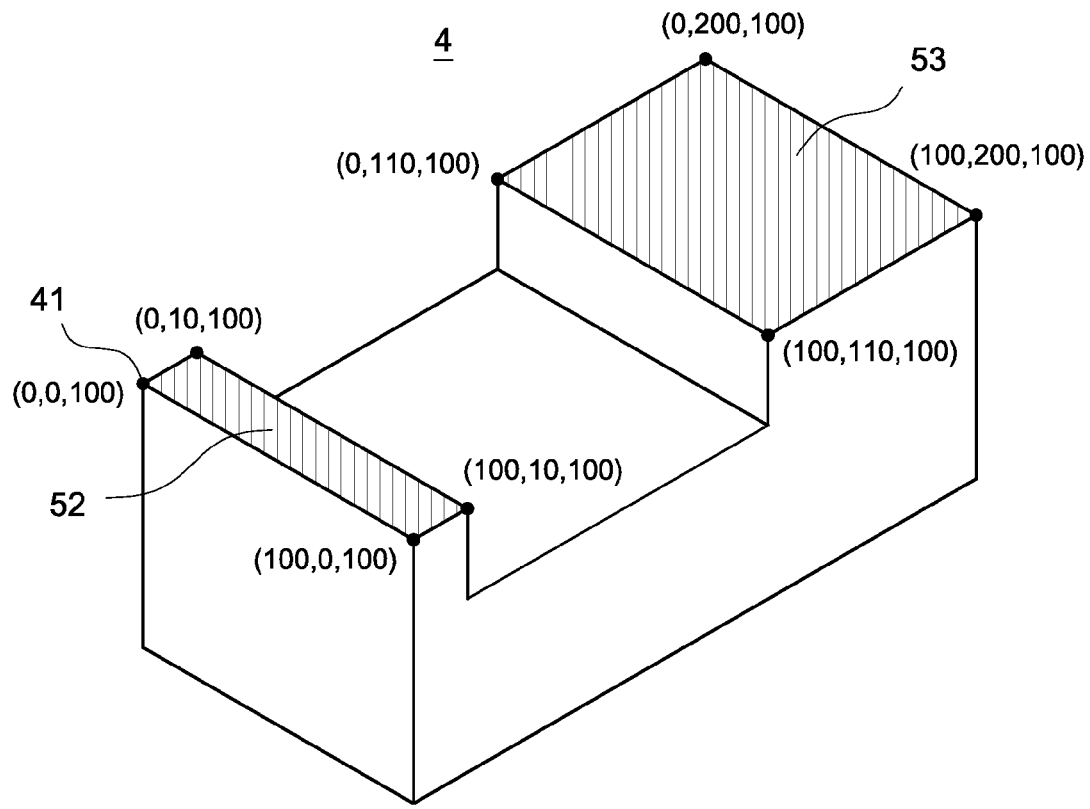
FIG. 5 is a schematic drawing of the third searching process according to the first embodiment of the present one of the exemplary embodiments.

Please refer to FIG. 3 in conjunction with FIG. 4 and FIG. 5, FIG. 3, FIG. 4 and FIG. 5 are respectively the schematic drawings of the first, the second and the third searching processes according to the first embodiment of the present one of the exemplary embodiments. As shown in FIG. 3, the outline of the first model 4 are constituted by a plurality of coordinate points. If the Z axis is set as the above mentioned datum axis, one of the coordinate points having the lowest value on the Z axis would be set as the initial locate point 41. In FIG. 3, the coordinate point (0, 0, 0) is set as the initial locate point 41, but the coordinate points (1, 0, 0), from (2, 0, 0) to (100, 0, 0), (100, 1, 0), from (100, 2, 0) to (100, 200, 0), (0, 1, 0), from (0, 2, 0) to (0, 200, 0), and (1, 200, 0), from (2, 200, 0) to (99, 200, 0) can also be set as the initial locate point 41, so it is not limited thereto.

After the locate point 41 has actually set by the editing software, the editing software searches all coordinate points having the same height as the locate pint 41 on the datum axis. If the locate point 41 is the coordinate point (0, 0, 0), the editing software searches the coordinate points from (1, 0, 0) to (100, 0, 0), from (100, 1, 0) to (100, 200, 0), from (0, 1, 0) to (0, 200, 0), and from (1, 200, 0) to (99, 200, 0), etc.

It is worth mentioning that, some model like words, symbols and the like are not suitable to be combined on the bottom of the first model 4. Thus, if the bottom of the first model 4 is not taken into consideration, the editing software would not reserve the coordinate points such as (1, 1, 0) and (2, 2, 0) because they are not on the area which excludes the bottom of the first model 4. From the above, if excluding the bottom of the first model 4, after searching by the editing software, it is known that the coordinate points (0, 0, 0), from (0, 1, 0) to (0, 200, 0), and (1, 0, 0), from (2, 0, 0) to (100, 0, 0) are continual; however, they can merely constitute a line but not a plane area.

After finishing the search for all coordinate points of which the value on the Z axis is "0", the editing software amends value on the Z axis in coordinate information of the locate point 41 by adding the fixed variable. For ease of explanation, "1" would be taken as an example of the fixed variable (that is, the adjusted value on the Z axis is "1", and the locate point 41 is (0, 0, 1)). After adjusting the value on the Z axis, the editing software again searches for all coordinate points of which the value on the Z axis is "1" on the outline of the first model 4, such as (1, 0, 1), from (2, 0, 1) to (100, 0, 1), (0, 1, 1), from (0, 2, 1) to (0, 200, 1), (100, 1, 1), from (100, 2, 1) to (100, 200, 1), and (1, 200, 1), from (2, 200, 1) to (99, 200, 1), and finds out whether there are a plurality of coordinate points that are continual and can constitute a plane area.

Further, as shown in FIG. 4, there is a first plane area 51 of which the value on the Z axis (the height) is "70". When the value on the Z axis in coordinate information of the locate point 41 is amended as "70" and the editing software searches all coordinate points of which the value on the Z axis is "70" on the outline of the first model 4, there are a plurality of coordinate points found on this height, which are continual and can constitute the first plane area. As shown in FIG. 4, take the first plane area 51 as an example, which is a rectangle block and constituted by four coordinate points (0, 10, 70), (100, 10, 70), (0, 110, 70) and (100, 110, 70), the first plane area 51 is constituted by ten thousands of coordinate points ((100−0)(110−10)=10,000).

If the first plane area 51 is larger than the predetermined threshold value and has not yet been reserved, the first plane area 51 would be reserved. On the other hand, if the first plane area 51 is smaller than the predetermined threshold value or has already been reserved for the combination with other 3D model, the editing software would abandon the first plane area 51 and not record it even though the first plane area 51 was found by the editing software.

In this embodiment, the editing software continually adds the value in the coordinate information of the locate point 41 on the datum axis (in this embodiment, it is the Z axis), and searches all coordinate points on the outline of the first model 4, which has the same height as the locate point 41 on the current datum axis. After that, as shown in FIG. 5, when the value of the locate point 41 on the Z axis is amended as the maximum value of the first model 4 on the Z axis, which is "100", there would be a plurality of coordinate points found on this height, which are continual and can constitute a second plane area 52 and there would also be a plurality of coordinate points found on this height, which are continual and can constitute a third plane area 53.

The editing software respectively compares the second plane area 52 and the third plane area 53 with the threshold value, and records the plane area which is larger than the threshold value and has not yet been reserved. In the embodiment shown by FIG. 4, the second plane area 52 is constituted by one thousand coordinate points, and the third plane area 53 is constituted by nine thousands coordinate points.

From the above, via the searching method of the present embodiment, after the editing software searches the first model 4, there are three plane areas found on the Z axis (excluding the bottom of the first model 4), that is, the first plane area 51, the second plane area 52 and the third plane area 53. If the editor tends to further search for plane area of the first model 4 on the X axis or the Y axis, he can set the X axis or Y axis as the datum axis and search again via the editing software.

From the above, the present embodiment is mainly to search for all coordinate points having the same height with the locate point 41 on the datum axis. It is worth mentioning that, in practice, there may be certain minor height differences between each coordinate point on one plane area (such as, concave points, convex points or several planes having height differences); however, the height differences have nothing to do with the combination between two 3D models.

Figure 6:
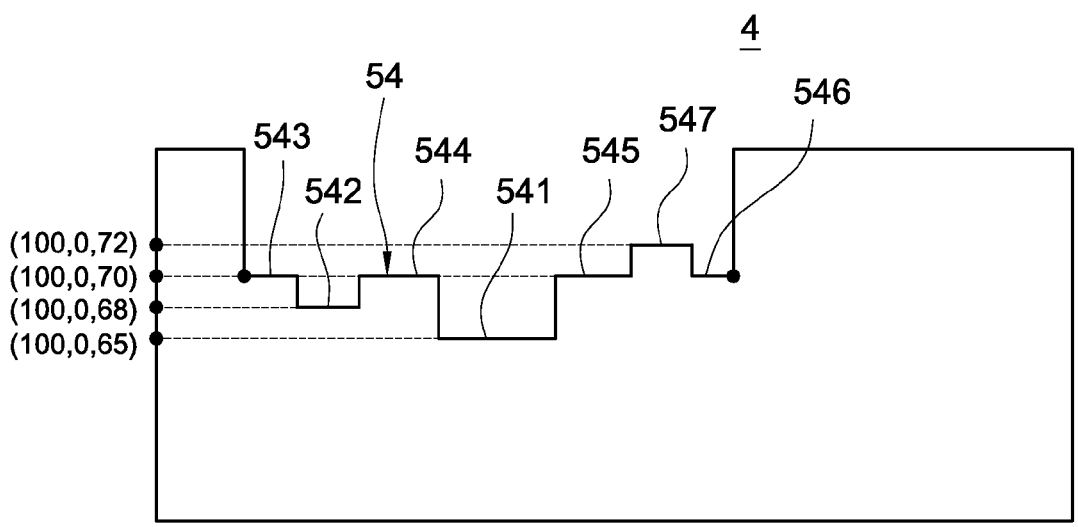
FIG. 6 is a schematic drawing of the plane area according to the second embodiment of the present one of the exemplary embodiments.

Please refer to FIG. 6, FIG. 6 is a schematic drawing of the plane area according to the second embodiment of the present one of the exemplary embodiments. In this embodiment, the datum axis is set as the Z axis. When the height of the locate point on the datum axis is adjusted to "65", (for example, the coordinate of the locate point is adjusted to (100, 0, 65)) the editing software would find out a plane 541 on the outline of the first model 4 at this height. If the plane 541 is larger than the threshold value and has not yet been reserved, the editing software would reserve the plane 541. On the other hand, if the plane 541 is not as required, the editing software would again adjust the height on the datum axis and restart to search.

When the height of the locate point on the datum axis is adjusted to "68" (for example, the coordinate of the locate point 41 is adjusted to (100, 0, 68)), the editing software would find another plane 542 on the outline of the first model 4 at this height. If the plane 542 is larger than the threshold value and has not yet been reserved, the editing software would reserve the plane 542. On the other hand, if the plane 542 is not as required, the editing software would again adjust the height on the datum axis and search again.

When the height of the locate point 41 on the datum axis is adjusted to "70" (for example, the coordinate of the locate point 41 is adjusted to (100, 0, 70)), the editing software would find a plurality of planes 543, 544, 545 and 546 which are no continual on the outline of the first model 4 at this height. At this time, the editing software respectively determines whether these planes 543, 544, 545 and 546 are larger than the threshold value, and determines whether these planes 543, 544, 545 and 546 have already been reserved, such that the editing software can further determine whether to reserve these planes 543, 544, 545 and 546, and further determine whether to again adjust the height on the datum axis so as to keep searching for planes having different heights.

It is worth mentioning that, when the editing software is searching for plane area of the outline of the first model 4 on the datum axis, there is usually an error value predetermined for the locate point 41. Particularly, the error value may be different based on different resolutions, such as 1-2 pixels or 5-10 pixels, etc.

As shown in FIG. 6, the plane 542 does not have the same height as the two adjacent planes 543 and 544, and thus they can't be considered a continual plane. However, if the height differences between the plane 542 and the two adjacent planes 543 and 544 are smaller than the above mentioned error value, the editing software would consider these three planes 542, 543 and 544 a continual plane. In addition, the plane 541 does not have the same height as the two adjacent planes 544 and 545; however, if the height differences between the plane 541 and the two adjacent planes 544 and 545 are smaller than the error value, the editing software would consider these planes 541~545 a continual plane.

More precisely, in addition to the concave plane, the editing software can also set an error value for the convex plane correspondingly. As shown in FIG. 6, the height of a plane 547 on the datum axis is "72" (that is, when the coordinate of the locate point 41 is adjusted to (100, 0, 72), the plane 547 would be found). However, if the height differences between the plane 547 and the two planes 545 and 546 are smaller than the above mentioned error value, the editing software would consider these planes 541~547 a continual plane. In this embodiment, the continual plane constituted by these planes 541~547 is the above fourth plane area 54. It could be seen that, when the locate point 41 is at different heights on the datum axis, the editing software would find out effective plane areas having different sizes.

As mentioned above, in the Step S24 shown in FIG. 2, the editing software searches for all coordinate points having the height which is the same as or very similar with the height of the locate point on the datum axis. Likewise, if the coordinate points on the outline of the first model 4 constitute an arc surface, and as long as its radian is within the range of the above mentioned error value, the editing software would still consider the arc surface an effective plane area. However, the above is merely one of preferred embodiments, so it should not be any limitation to the present invention.

Further, according to the different resolutions and printing speeds of the 3D printer, the editing software needs not to search for each coordinate point on the outline of the first model 4. For example, if the current locate point 41 is (0, 0, 70) and the datum axis is set as the Z axis, the editing software can merely search for the coordinate points (3, 0, 70), (6, 0, 70), (9, 0, 70) and will not search for the coordinate points (1, 0, 70), (2, 0, 70), (4, 0, 70), (5, 0, 70), (7, 0, 70) and (8, 0, 70). Moreover, as mentioned above, the minor height difference has nothing to do with the combination of 3D models. Thus, via the ways mentioned above, it can prevent the editing software from misjudgment that there is no continual and effective plane area on the outline because of certain convex points, concave points or planes having different heights.

In the above embodiment, for the ease of explanation, it takes a smoothing concave body as an example. However, in practice, the 3D model imported into the editing software may be extremely uneven. It is hard for the editor to determine with his naked eyes where the even plane is on the model and whether the actual area of the even plane is as required, so there is a need for the editing software and the searching method of the present embodiment to quickly search for the required plane areas.

Figure 7:
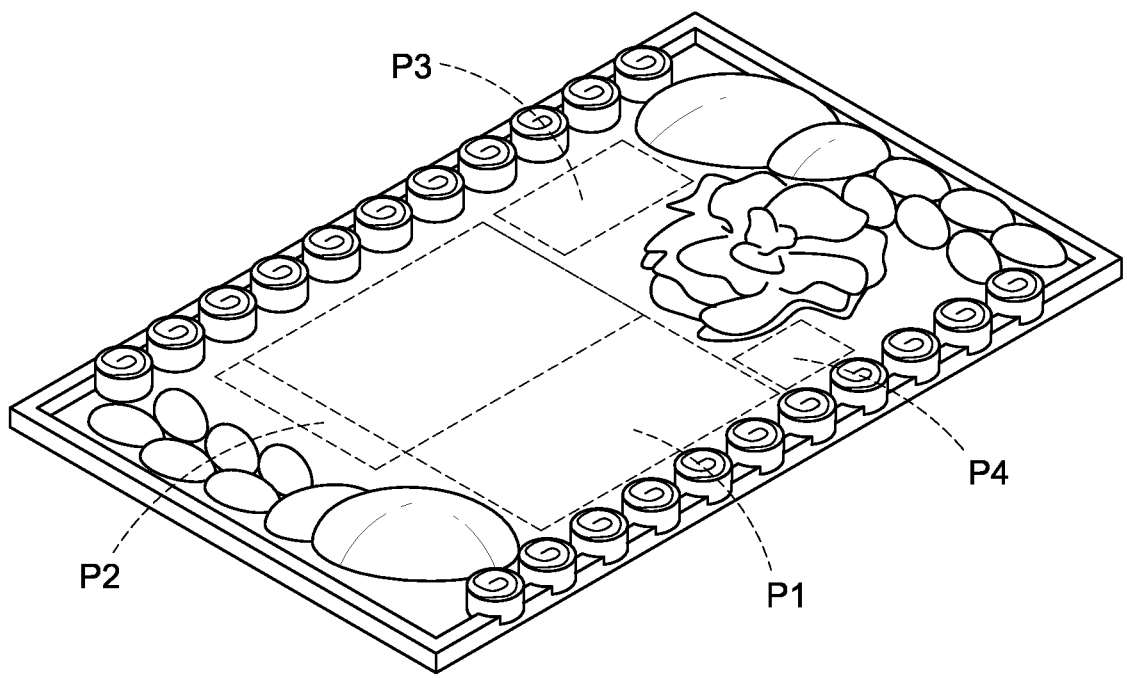
FIG. 7 is a schematic drawing of the plane area according to the third embodiment of the present one of the exemplary embodiments.

Please refer to FIG. 7, FIG. 7 is a schematic drawing of the plane area according to the third embodiment of the present one of the exemplary embodiments. Disclosed in FIG. 7 is an irregular model 40, and surface of the irregular model 40 is rather uneven so that the editor would feel hard to distinguish the required plane area on the irregular model 40 with his naked eyes instantly. However, via the searching method of the present embodiment, after the irregular model 40 is imported into the editing software, planes P1, P2, P3 and P4 can be found at different height on the datum axis.

In this embodiment, the planes P1~P4 may at the same height on the datum axis, which means that they constitute a continual plane, and also, the planes P1~P4 may at different heights on the datum axis, which means that they are plane areas which are not continual. In addition, although the planes P1~P4 may be at different heights on the datum axis, as long as the height difference is smaller than the above mentioned error value, the editing software would still consider them a continual plane area. However, the above is merely one of the preferred embodiments, so it should not be any limitation to the present invention.

Figure 8:
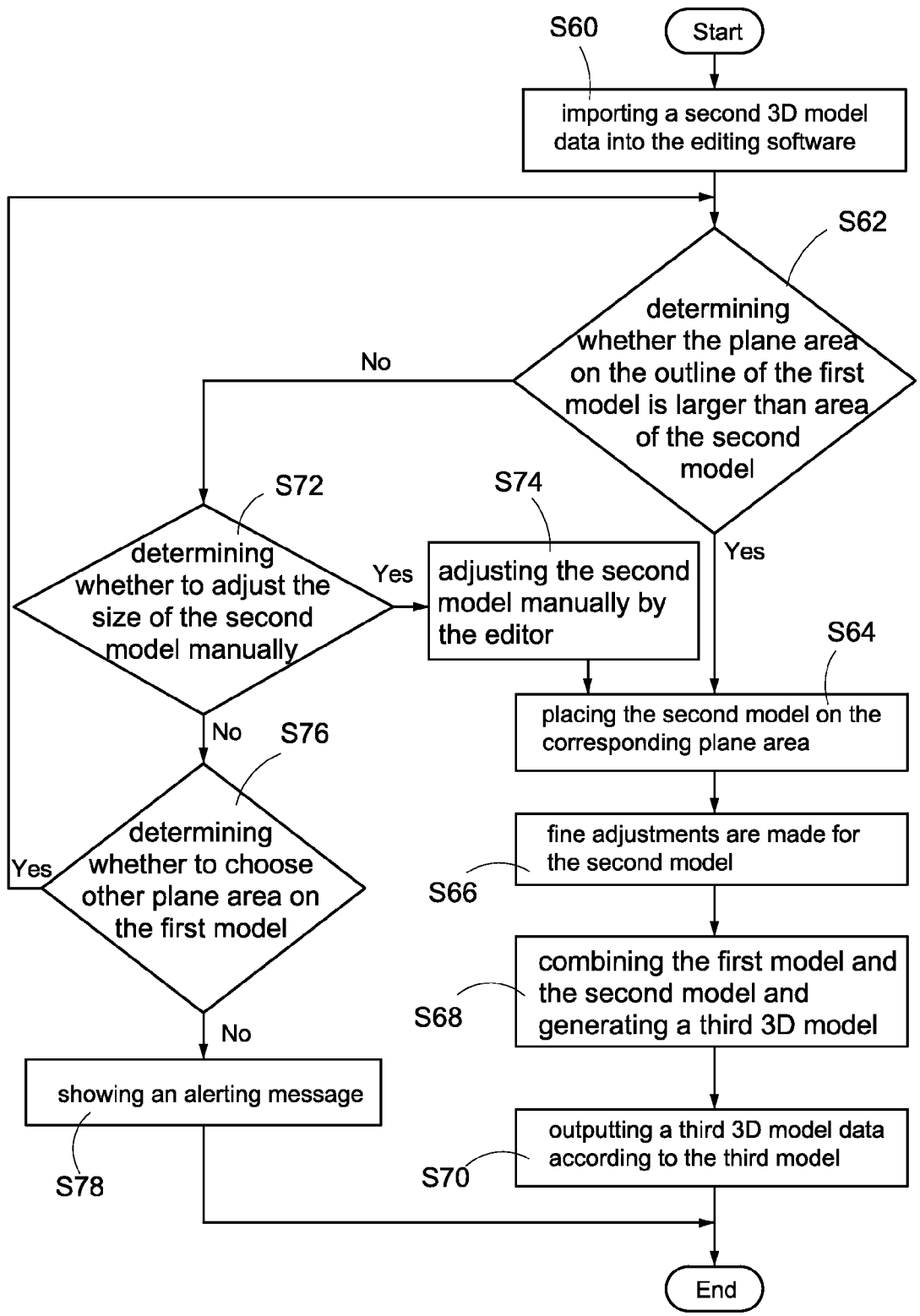
FIG. 8 is a flow chart for combining 3D models according to the first embodiment of the present one of the exemplary embodiments.

Please refer to FIG. 8, FIG. 8 is a flow chart for combining 3D models according to the first embodiment of the present one of the exemplary embodiments. After the search for all plane areas on the first model 4 is finished, a second 3D model data is imported into the editing software (Step S60) so as to open a second 3D model (as the second 3D model 8 shown in FIG. 9A, hereinafter referred to as the second model 8) in the editing software. One of the exemplary embodiments, the second 3D model data is a file having ".stl" as its extension; however; it is not limited thereto.

After opening the second model 8, the editing software determines whether one or several plane areas on the outline of the first model 4 are larger than area of the second model 8 (Step S62). If any plane area on the outline of the first model 4 is larger than area of the second model 8, the second model 8 would be placed on the corresponding plane area (Step 64). In this embodiment, if there are a plurality of plane areas are larger than area of the second model 8, the editing software chooses to use the maximum plane area as priority, or chooses to use the square plane area as priority, so as to place the second model 8, but it is not limited thereto. Moreover, in other embodiments, the editing software can also choose to use the plane area having a least difference with area of the second model 8 (that is, to make sure that the area difference between the chosen area and area of the second model 8 is the least, so as to prevent from wasting plane areas).

It is worth mentioning that, among the one or several plane areas on the first model 4, if there is a recorded plane area which reserves for the second model 8, the software would directly place the second model 8 into the recorded plane area that is reserved in advance without comparing.

After placing the second model 8, fine adjustments can be made for the second model 8 (Step S66), such as the fine tuning for the size and rotating angle, or changing to place other plane area, and it is not limited thereto.

After confirming the size, position and angle for the second model 8, the editing software can be triggered automatically or manually by the editor, so as to combine the first model 4 and the second model 8 and generate a third 3D model (as the third 3D model 9 shown in FIG. 9B, hereinafter referred to as the third model 9) (Step S68). Finally, a third 3D model data is output according to the third model 9 (Step S70). In this embodiment, the third 3D model data is also a file having ".stl" as its extension; however, it is not limited thereto. One of the exemplary embodiments, the first model 4 can be combined with several 3D models, and thus, in addition to the second model 8, if the first model 4 needs to combine with other 3D models, it can execute the above steps S60~S66 repeatedly.

In the Step S62, the editing software determines that the plane area is smaller than area of the second model 8, and then the editing software determines whether the editor should adjust the size of the second model 8 manually (Step S72). If yes, the editor adjusts the second model 8 manually (Step S74) and the editing software further executes the Step S64.

Accordingly, if the editor chooses not to adjust the size of the second model 8 manually, the editing software further determines whether to choose to use other plane area on the first model 4 (Step S76). If yes, it turns back to the Step S62 so as to determine whether another plane area is larger than area of the second model 8. Moreover, if the editing software determines that there is no other plane area that can be chosen in the Step S76, the editing software shows an alerting message (Step S78) so as to remind the editor of the fact that the second model 8 can't be combined with the first model 4.

Figure 9A:
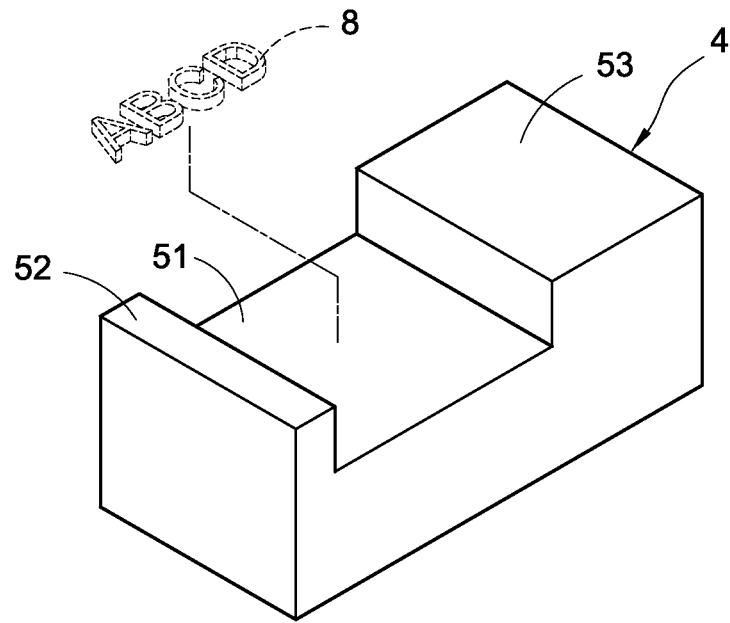
FIG. 9A is a schematic drawing of the first combination according to the first embodiment of the present one of the exemplary embodiments.
Figure 9B:
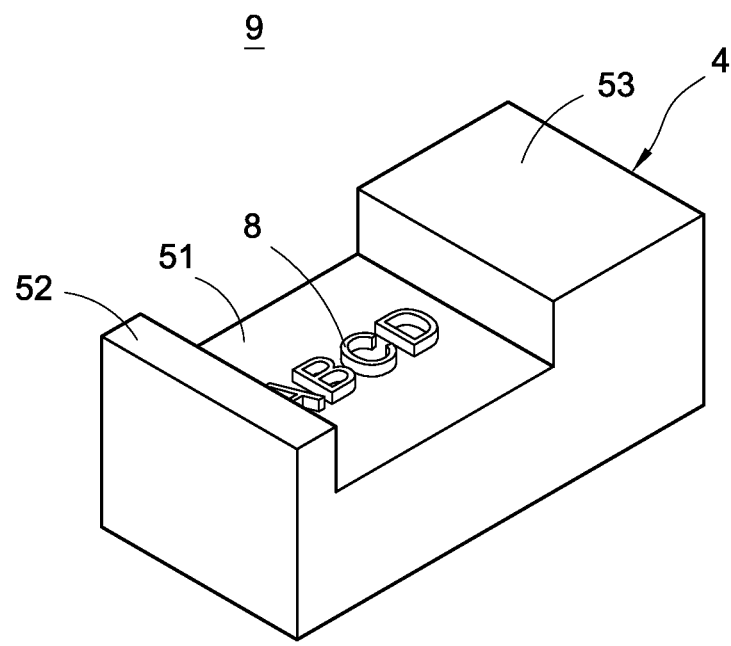
FIG. 9B is a schematic drawing of the second combination according to the first embodiment of the present one of the exemplary embodiments.

Please refer to FIG. 9A and FIG. 9B, FIG. 9A and FIG. 9B are respectively the schematic drawings of the first combination and the second combination according to the first embodiment of the present one of the exemplary embodiments. As shown in FIG. 9A, after the second model 8 is opened, the editing software determines whether the first plane area 51, the second plane area 52 and the third plane area 53 are larger than area of the second model 8, and whether they have been reserved already. In this embodiment, if theses plane areas 51~53 have not yet been reserved, the editing software would choose to use the second plane area 52 that is maximum or the third plane area 53 that is square as priority.

In this embodiment, the third plane area 53 is smaller than area of the second model 8. If the second model 8 needs to be placed into the third plane area 53, it is necessary for the editor to adjust the size of the second 8 manually. Therefore, in this embodiment, the editing software chooses to use the second plane area 52 as priority, but it is not limited thereto.

As shown in FIG. 9B, after the second model 8 is placed into the second plane area 52, the editor can further make certain fine adjustments of parameters such as size, position or angle for the second model 8. After finishing the fine adjustments, the editing software can combine the first model 4 and the second model 8 into the single third model 9 and output the third 3D model data according to the third model 9. It is worth mentioning that, after the third 3D model data is again imported by the editing software, the third model 9 would be opened; however, the third model 9 is an independent 3D model so the editor can't edit the first model 4 and the second model 8, respectively.

Via the searching method provided by the present embodiment, after the editing software opens the second model 8, the second model 8 can be automatically placed into the most appropriate position on the outline of the first model 4, and thus the editor would not need to search for plane area on the outline of the first model 4 with his naked eyes and would not need to edit the second model 8 and combine it with the first model 4 manually, either. Besides, if there are a plurality of plane areas or a large plane area on the outline of the first model 4, it can also combine the first model 4 with several models and the number of the models for combining should not be limited to two.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method for printing a 3D object and searching a plane of a 3D model, using an editing software executed in a computing device, the method comprising:
 a) importing a first 3D model data and opening a first 3D model according to the first 3D model data at the computing device;
 b) obtaining an outline of the first 3D model at the computing device;
 c) obtaining coordinate information of a plurality of coordinate points within the outline at the computing device;
 d) setting one of three axes of the first 3D model to be a datum axis at the computing device;
 e) setting a lowest point of the outline of the first 3D model based on the datum axis to be a locate point at the computing device;
 f) extending from the locate point along another two of three axes to search all of the coordinate points within the outline at a substantially similar height of the datum axis with the locate point at the computing device;

g) reserving the coordinate information of the coordinate points being continual and capable of constituting a plane area at the computing device;

h) after the step g), if the locate point is not a highest point of the outline on the datum axis, amending a value on the datum axis of the locate point by adding a fixed variable at the computing device, wherein the fixed variable is a value of a desired precision of the 3D object; and i) after the step h), executing the steps f), g), and h) according to the amended locate point at the computing device w) printing the 3D object.

2. The searching method for plane of 3D model of claim 1, further comprising:
   j) after the step g), determining whether the plane area is larger than a threshold value;
   k) recording the plane area if the plane area is larger than the threshold value; and
   l) abandoning the plane area if the plane area is smaller than the threshold value.

3. The searching method for plane of 3D model of claim 2, wherein the step k) further comprises:
   k1) determining whether the plane area has been reserved if the plane area is larger than the threshold value;
   k2) recording the plane area if the plane area has not yet been reserved; and
   k3) abandoning the plane area if the plane area has already been reserved.

4. The searching method for plane of 3D model of claim 2, wherein the threshold value is an area value of a second 3D model, and the second 3D model is configured to be placed on the plane area on the outline of the first 3D model.

5. The searching method for plane of 3D model of claim 2, further comprising:
   m) importing a second 3D model data and opening a second 3D model;

n) determining whether the plane area is larger than an area of the second 3D model; and o) placing the second 3D model on the plane area if the plane area is larger than the area of the second 3D model.

6. The searching method for plane of 3D model of claim 5, wherein the step l) further comprises:
   p) combining the first 3D model and the second 3D model so as to generate a third 3D model; and
   q) outputting a third 3D model data according the third 3D model.

7. The searching method for plane of 3D model of claim 5, wherein the largest plane area is chosen as priority in the step o) if there are a plurality of plane areas on the outline.

8. The searching method for plane of 3D model of claim 5, wherein choosing the plane area which is square as priority in the step o) if there are a plurality of plane areas on the outline.

9. The searching method for plane of 3D model of claim 5, wherein the plane area having a least difference with area of the second 3D model is chosen as priority in the step o) if there are a plurality of plane areas on the outline.

10. The searching method for plane of 3D model of claim 5, further comprising:
    r) determining whether to adjust the second 3D model if the plane area is smaller than the area of the second 3D model;
    s) placing the adjusted second 3D model on the plane area if the second 3D model is adjusted;
    t) determining whether there is another plane area on the outline if the second 3D model is not adjusted; and
    u) executing the above steps n) and o) another plane area if there is another plane area on the outline.

11. The searching method for plane of 3D model of claim 10, further comprising:
    v) after the step t), showing an alerting message if there is not another plane area on the outline.

* * * * *